United States Patent
Chang et al.

(10) Patent No.: US 9,352,303 B2
(45) Date of Patent: May 31, 2016

(54) MIXED METAL OXIDE CATALYST FOR DECOMPOSITION OF NITROGEN OXIDES

(75) Inventors: Kil Sang Chang, Goyang-si (KR); Xiaoshan Peng, Seoul (KR); Seo Young Park, Seoul (KR); Ki Seon Yang, Seoul (KR); A Reum Han, Seoul (KR)

(73) Assignee: Sangmyung University, Council for Industry Academic Cooperation, Chungcheongnam-do (KR)

( * ) Notice: Subject to any disclaimer, the term of this patent is extended or adjusted under 35 U.S.C. 154(b) by 772 days.

(21) Appl. No.: 13/498,658

(22) PCT Filed: Sep. 30, 2010

(86) PCT No.: PCT/KR2010/006683
§ 371 (c)(1),
(2), (4) Date: May 21, 2012

(87) PCT Pub. No.: WO2011/040775
PCT Pub. Date: Apr. 7, 2011

(65) Prior Publication Data
US 2012/0230899 A1 Sep. 13, 2012

(30) Foreign Application Priority Data
Sep. 30, 2009 (KR) .......... 10-2009-0093416

(51) Int. Cl.
*B01D 53/56* (2006.01)
*B01J 23/78* (2006.01)
*B01D 53/94* (2006.01)
*B01J 23/00* (2006.01)
*B01J 37/03* (2006.01)

(52) U.S. Cl.
CPC ............. *B01J 23/78* (2013.01); *B01D 53/9418* (2013.01); *B01D 53/9427* (2013.01); *B01J 23/002* (2013.01); *B01J 23/007* (2013.01); *B01J 37/03* (2013.01); *B01D 2251/204* (2013.01); *B01D 2251/206* (2013.01); *B01D 2251/208* (2013.01); *B01D 2251/21* (2013.01); *B01D 2255/1021* (2013.01); *B01D 2255/1023* (2013.01); *B01D 2255/1025* (2013.01); *B01D 2255/2022* (2013.01); *B01D 2255/20753* (2013.01); *B01D 2257/402* (2013.01); *B01D 2257/404* (2013.01); *Y02C 20/10* (2013.01)

(58) Field of Classification Search
CPC .................................................. B01D 53/8628
USPC ........ 502/330, 344, 355; 423/239.1, 246, 248
See application file for complete search history.

(56) References Cited

U.S. PATENT DOCUMENTS

| 5,705,136 A | 1/1998 | Drago et al. |
| 6,419,890 B1 | 7/2002 | Li |
| 2007/0274891 A1* | 11/2007 | Haik-Beraud et al. ..... 423/239.1 |

FOREIGN PATENT DOCUMENTS

| EP | 0640379 A1 | 3/1995 |
| EP | 1142623 A3 | 10/2001 |
| JP | 07163870 | 6/1995 |
| WO | WO0211866 A2 | 2/2002 |

OTHER PUBLICATIONS

Pekridis et al., N2O Abatement Over c-Al2O3 Supported Catalysts: Effect of Reducing Agent and Active Phase Nature, Top Catal (2009) 52:1880-1887.*
European Search Report dated May 3, 2013 in Application No. 10820848.9-1352/2484442; PCT/KR2010006683.
Office Action dated Jul. 30, 2013 issued by the Chinese Patent Office. (Translation Attached).
Cheng et al.; "N2O decomposition over K-promoted Co—Al catalysts prepared from hydrotalcite-like precursors"; Applied Catalysis B: Environmental 89 (2009); 391-397.
Office Action dated Jun. 25, 2013 issued by the Japanese Patent Office. (English Translation Submitted).

* cited by examiner

*Primary Examiner* — Matthew E Hoban
*Assistant Examiner* — James Fiorito
(74) *Attorney, Agent, or Firm* — Abelman, Frayne & Schwab

(57) ABSTRACT

The present invention relates to a mixed metal oxide catalyst in which a hydrotalcite precursor containing an alkali metal is impregnated or intercalated with a nonprecious metal, a method of manufacturing the same, and a method of decomposing nitrogen oxide using the mixed metal oxide catalyst. The mixed metal oxide catalyst has excellent catalytic activity because it can decompose $NO_x$, $N_2O$ or a mixture thereof even at low temperature, and is economical because it does not use a precious metal.

4 Claims, No Drawings

MIXED METAL OXIDE CATALYST FOR DECOMPOSITION OF NITROGEN OXIDES

CROSS-REFERENCE TO RELATED APPLICATIONS

This application is a National Phase of PCT/KR2010/006683, filed Sep. 30, 2010, which claims priority from Korean Application No. 10-2009-0093416, filed Sep. 30, 2009 which are incorporated herein by reference.

TECHNICAL FIELD

The present invention relates to a mixed metal oxide catalyst in which a hydrotalcite precursor containing an alkali metal is impregnated or intercalated with a nonprecious metal, a method of manufacturing the same, and a method of decomposing nitrogen oxide using the mixed metal oxide catalyst.

BACKGROUND ART

As the damage caused by climate change increases all over the world, air pollution problem has recently attracted considerable attention. Among materials related to global warming, nitrous oxide ($N_2O$) contributes to the greenhouse effect, 310 times as much as carbon dioxide ($CO_2$), is a compound stable in air, and is presumed to stay in the air for 20~100 years. Further, nitrous oxide ($N_2O$) destroys the ozone layer of the stratosphere. Therefore, it is known that, when the amount of nitrous oxide ($N_2O$) increases two fold, the amount of ozone decreases by 2%.

Nitrogen oxides are necessary by-products of the procedure of burning fossil fuels or incinerating various wastes, and generate photochemical smog and various secondary pollutants ($O_3$, PAN, etc.) through a photochemical reaction that takes place in the air. That is, nitrogen oxides are very important in terms of air pollution. In order to cope with such crises caused by climate change, it is required to effectively remove nitrous oxide ($N_2O$) as a greenhouse gas together with nitrogen oxides ($NO_X$).

Referring to conventional technologies related to the decomposition of $N_2O$ and $NO_X$, there are proposed a method of controlling the temperature of a combustion furnace, a method of recirculating exhaust gas, a method of mounting a special burner, and the like. However, these methods are poor in terms of performance. Thereafter, selective catalytic reduction (SCR) has been put to practical use, but has the problems of high equipment cost and its performance worsening with aging of the catalyst.

Patent document 1, filed by Alini et al, discloses a method of decomposing $N_2O$ gas at a temperature of 400° C. or more using a rhodium (Rh)-containing hydrotalcite catalyst. However, this method is problematic in that $N_2O$ at a very low concentration of 200 ppm or less must react at a high temperature of 400° C. or more and the rhodium (Rh)-containing hydrotalcite catalyst is expensive.

Patent document 2 discloses a method of catalytically reducing nitrogen oxides included in exhaust gas containing light hydrocarbons using the exhaust gas as a reductant and using β-Zeolite exchanged with a cobalt salt as a catalyst. However, this method is problematic in that the conversion ratio of $N_2O$ is low although $N_2O$ is reacted at high temperature using a large amount of a reductant which is two or more times larger than that used with $NO_X$.

According to the paper [Reduction of $N_2O$ with CO Over FeMFI zeolites., Catal. 223(2004)] written by Javier P. R. et al., when $N_2O$ was decomposed using a zeolite catalyst coated with iron (Fe) in the presence of carbon monoxide (CO) as a reductant, the decomposition rate of $N_2O$ was improved compared to those of conventional technologies. However, there is a problem in that $N_2O$ must be decomposed at a high temperature of 400° C. or more.

Patent document 3 discloses a method of directly reducing nitrogen oxide by catalytic reduction using a catalyst in which a solid powdered carrier is supported with a metal. However, this method is problematic in that the conversion ratio of $N_2O$ is 50% or less even at a high temperature of 400° C. or more.

Patent document 4, filed by Schwefer et al., discloses a method of decomposing $N_2O$ and $NO_X$ at a temperature of 450° C. and a pressure of 6.5 bar using an iron-containing ZSM-5 catalyst and a reductant (ammonia). However, this method is problematic in that the conversion ratio of $N_2O$ is 64% and the conversion ratio of $NO_X$ is 78%, each of which is somewhat low, and in that the decomposition temperature and pressure are high.

In Patent document 5 filed by Nagata, Hihara et al., β-Zeolite exchanged with iron ion was impregnated with ferric nitrate and then calcinated at 500° C. for 5 hours to prepare an ion-exchanged catalyst containing about 4% of iron oxide, and then this catalyst was mixed with a binder and then applied onto a honeycomb support, and then the performance of the catalyst was tested. In this case, when $NO_X$ included in the exhaust gas of a diesel engine was decomposed at the low temperature of 200° C. using urea as a reductant, there is a problem in that the conversion ratio of $NO_X$ is about 43%, which is low.

Patent document 1: European Patent Publication No. 1262224
Patent document 2: Korea Patent No. 0359675
Patent document 3: Korea Patent No. 0408880
Patent document 4: U.S. Pat. No. 7,462,340
Patent document 5: U.S. Pat. No. 7,501,105

DISCLOSURE

Technical Problem

Thus, in order to solve the above-mentioned problems, the present inventors have done broad research. As a result, they found that the catalytic activity of a mixed metal oxide catalyst, in which a hydrotalcite precursor containing an alkali metal is impregnated or intercalated with a nonprecious metal, is equal to that of a precious metal catalyst such as Rh, Pd or the like in the decomposition of nitrogen oxides. Based on this finding, the present invention was completed.

Accordingly, an object of the present invention is to provide a catalyst for the decomposition of nitrogen oxides, in which a hydrotalcite precursor containing an alkali metal is impregnated or intercalated with a nonprecious metal.

Another object of the present invention is to provide a method of manufacturing the catalyst for the decomposition of nitrogen oxides.

Still another object of the present invention is to provide a method of decomposing $NO_X$, $N_2O$ or a mixture thereof even at low temperature using the catalyst for the decomposition of nitrogen oxides.

Technical Solution

In order to accomplish the above objects, an aspect of the present invention provides a mixed metal oxide catalyst for the decomposition of nitrogen oxides, in which a hydrotalcite precursor containing an alkali metal is impregnated or intercalated with a nonprecious metal.

Here, the hydrotalcite precursor containing an alkali metal is represented by Formula 1 below:

$$L^+_a \cdot [M^{2+}_{1-x} N^{3+}_x (OH)_2]^{x+} [A^{n-}_{(x+a)/n} \cdot bH_2O]$$ [Formula 1]

wherein $L^+$ is at least one selected from the group consisting of $Na^+$, $K^+$, $Li^+$, $Rb^+$, $Cs^+$ and $Fr^+$; $M^{2+}$ is at least one selected from the group consisting of $Mg^{2+}$, $Ca^{2+}$, $Ni^{2+}$, $Zn^{2+}$, $Sr^{2+}$, $Ba^{2+}$, $Fe^{2+}$, $Cu^{2+}$, $Co^{2+}$, $Pd^{2+}$ and $Mn^{2+}$; $N^{3+}$ is at least one selected from the group consisting of $Al^{3+}$, $Mn^{3+}$, $Fe^{3+}$, $Co^{3+}$, $Ni^{3+}$, $Cr^{3+}$, $Ga^{3+}$, $B^{3+}$, $La^{3+}$, $Ce^{3+}$ and $Rh^{3+}$; $A^{n-}$ is at least one selected from the group consisting of $CO_3^{2-}$, $NO_3^-$, $SO_4^{2-}$, $Cl^1$, $OH^-$, $SiO_3^{2-}$, $MnO_4^{2-}$, $HPO_3^{2-}$, $MnO_4^{2-}$, $HGaO_3^{2-}$, $HVO_4^{2-}$, $ClO_4^-$ and $BO_3^{2-}$; x is 0.01~0.5; a is 0.01~1; and b is an integer of 0~20.

Further, the nonprecious metal may be at least one selected from the group consisting of Ni, Co, Fe, Mn, Al, Ce, Cu, Zn, Ba, Mg, Ca and Sr, and an amount of the nonprecious metal may be 0.01~20 wt %.

Another aspect of the present invention provides a method of manufacturing a mixed metal oxide catalyst for decomposition of nitrogen oxides, including the steps of: providing a hydrotalcite precursor containing an alkali metal; impregnating or intercalating the hydrotalcite precursor with a nonprecious metal; and calcinating the hydrotalcite precursor impregnated or intercalated with the nonprecious metal at a temperature of 100~1000° C. to form a mixed metal oxide catalyst.

Still another aspect of the present invention provides a method of decomposing nitrogen oxide using a mixed metal oxide catalyst, comprising the step of reacting nitrogen oxide including nitrogen oxides including $N_2O$, $NO_x$ and a mixture thereof with a gas mixture including a reductant in the presence of a mixed metal oxide catalyst in which a hydrotalcite precursor containing an alkali metal is impregnated or intercalated with a nonprecious metal.

Here, the reductant may be at least one selected from the group consisting of a hydrocarbon of 1 to 6 carbon atoms, an alcohol of 1 to 6 carbon atoms, $SO_2$, $NH_3$ and CO.

Further, gas may pass through the catalyst at a gas hour space velocity of 1,000 h$^{-1}$~200,000 $^{-1}$, and the pressure of the gas may be 1 atm or more.

Further, the reaction temperature may be 150~500° C.

Further, the amount of the nitrogen oxide may be 0.001~31 wt %, and the amount of the reductant may be 0.001~21 wt %.

Advantageous Effects

According to the present invention, when the mixed metal oxide catalyst manufactured using a hydrotalcite precursor containing an alkali metal is used to decompose nitrogen oxides, the mixed metal oxide catalyst can exhibit catalytic activity equal to that of a precious metal catalyst without using a precious metal such as Pd, Rh or the like, thus reducing production cost. Further, the mixed metal oxide catalyst can effectively decompose nitrogen oxides even at a low temperature of 300° C. or less, so that operation cost can be reduced, with the result that this catalyst can be used for a long period of time.

BEST MODE

Hereinafter, the present invention will be described in detail.

As described above, the present invention provides a mixed metal oxide catalyst for the decomposition of nitrogen oxide, in which a hydrotalcite precursor is impregnated or intercalated with an alkali metal such as potassium (K) or the like, and thus which can decompose industrially-produced nitrogen oxides including $N_2O$, $NO_x$ and a mixture thereof by a simple and economical process.

Further, the present invention provides a method of manufacturing a mixed metal oxide catalyst for decomposition of nitrogen oxides, including the steps of: providing a hydrotalcite precursor containing an alkali metal; impregnating or intercalating the hydrotalcite precursor with a nonprecious metal; and calcinating the hydrotalcite precursor impregnated or intercalated with the nonprecious metal at a temperature of 100~1000° C. to form a mixed metal oxide catalyst.

A hydrotalcite compound is an anionic clay compound whose upper and lower layers are charged with cations and whose intermediate layer is can be exchanged with anions. A hydrotalcite compound is composed of a magnesium hydrate, an aluminum hydrate or the like, which resourcefully exists in the Earth, and is artificially synthesized by forming anions of a chelating agent and a complex compound and then co-precipitating the anions to introduce metal cations into a doubly-layered hydrate.

A hydrotalcite compound has a large surface area, a high memory effect and a basic composition, and is formed by heating into a homogeneous oxide having a very small particle size, crystallinity and stability to heat treatment. In the hydrotalcite compound, bivalent metals are partially substituted with trivalent metals whose sizes are similar to those of the bivalent metals, so that the negative charge of the layers thereof is relatively insufficient to allow the hydrotalcite compound to be positively charged to form positive charges, and anions such as $CO_3^{2-}$, $OH^-$ or the like intercalated between the layers in order to offset the formed positive charges, and water coordinates with the anions, thereby forming a layered structure.

In the present invention, a hydrotalcite compound containing an alkali metal such as potassium (K) or the like is used as a precursor of a mixed metal oxide catalyst.

The hydrotalcite precursor containing an alkali metal is a porous material represented by Formula 1 below, and is variously used as a catalyst $$L^+_a \cdot [M^{2+}_{1-x} N^{3+}_x (OH)_2]^{x+} [A^{n-}_{(x+a)/n} \cdot bH_2O]$$ [Formula 1]

In the hydrotalcite precursor, $L^+$, $M^{2+}$ and $N^{3+}$ are metal cations, respectively. Here, $L^+$ is a monovalent alkali metal cation selected from the group consisting of $Na^+$, $K^+$, $Li^+$, $Rb^+$, $Cs^+$ and $Fr^+$; $M^{2+}$ is a bivalent alkali metal cation selected from the group consisting of $Mg^{2+}$, $Ca^{2+}$, $Ni^{2+}$, $Zn^{2+}$, $Sr^{2+}$, $Ba^{2+}$, $Fe^{2+}$, $Cu^{2+}$, $Co^{2+}$, $Pd^{2+}$ and $Mn^{2+}$; $N^{3+}$ is a trivalent alkali metal cation selected from the group consisting of $Al^{3+}$, $Mn^{3+}$, $Fe^{3+}$, $Co^{3+}$, $Ni^{3+}$, $Cr^{3+}$, $Ga^{3+}$, $B^{3+}$, $La^{3+}$, $Ce^{3+}$ and $Rh^{3+}$. The molar ratio of $M^{2+}$ and $N^{3+}$ may be 1:1~100:1, preferably 1:1~5:1.

Further, in the hydrotalcite precursor, $A^{n-}$ is at least one anionic compound selected from the group consisting of $CO_3^{2-}$, $NO_3^-$, $SO_4^{2-}$, $Cl^-$, $OH^-$, $SiO_3^{2-}$, $MnO_4^2$, $HPO_3^{2-}$, $MnO_4^{2-}$, $HGaO_3^{2-}$, $HVO_4^{2-}$, $ClO_4^-$, $BO_3^{2-}$ and combinations thereof.

Meanwhile, in Formula 1 above, a is 0.01~1, x is 0.01~0.5, and b is an integer of 0~20.

Since the mixed metal oxide catalyst produced from the hydrotalcite precursor containing an alkali metal is impregnated or intercalated with a nonprecious metal, an expensive precious metal, as is normally used to improve catalytic activity, may be replaced by a nonprecious metal.

In the manufacture of the mixed metal oxide catalyst, the hydrotalcite precursor containing an alkali metal can be impregnated or intercalated with a nonprecious metal by preparing a nonprecious nitrate solution and then mixing the solution with a hydrotalcite precursor to cause an ion exchange reaction therebetween.

Here, the nonprecious metal may be at least one selected from the group consisting of Ni, Co, Fe, Mn, Al, Ce, Cu, Zn, Ba, Mg, Ca and Sr, preferably, Ni, Co, Fe, Mg, Al, Ca, and most preferably, Ni. The amount of the nonprecious metal is 0.01~20 wt %, preferably, 0.01~15 wt %. When the amount thereof is less than 0.01 wt %, the effect of increasing catalytic activity is barely realized depending on the use of the nonprecious metal. Further, when the amount thereof is more than 20 wt %, pores formed in the mixed metal oxide catalyst are blocked, so that the specific surface area of the catalyst is reduced, thereby decreasing the decomposition ratio.

In the present invention, when the hydrotalcite precursor impregnated or intercalated with a nonprecious metal is calcinated at a temperature of 100~1000° C. preferably, 400~800° C. it is reliably formed into a mixed metal oxide.

The mixed metal oxide catalyst of the present invention may be further impregnated or intercalated with a new precious metal after the calcination in consideration of the purpose and efficiency of the catalyst. For example, the mixed metal oxide produced from the hydrotalcite precursor impregnated or intercalated with aluminum (Al) as a nonprecious metal is mixed with a magnesium (Mg) nitrate solution and then dried to manufacture the mixed metal oxide catalyst of the present invention.

The process of manufacturing the mixed metal oxide catalyst including an alkali metal may be variously modified without departing from the scope and spirit of the invention.

According to a modified embodiment of the present invention, a mixed metal oxide produced from a hydrotalcite precursor containing only an alkali metal is calcinated, and is then impregnated with a nonprecious metal to manufacture a mixed metal oxide containing a nonprecious metal and an alkali metal. According to another modified embodiment of the present invention, a mixed metal oxide produced from a hydrotalcite precursor containing only a nonprecious metal is calcinated, and is then impregnated with an alkali metal to manufacture a mixed metal oxide containing a nonprecious metal and an alkali metal.

The catalytic activity of the alkali metal-containing mixed metal oxide catalyst impregnated or intercalated with a nonprecious metal according to the present invention is equal to that of a conventional catalyst impregnated or intercalated with a precious metal in the decomposition of nitrogen oxide. According to the present invention, in the reaction that decomposes $NO_x$, $N_2O$ and a mixture thereof using the mixed metal oxide catalyst produced from the hydrotalcite precursor, the gas mixture passing through the catalyst layer includes 0.001~31 wt % of nitrogen oxide and 0.001~21 wt % of a reductant.

The reductant used in the present invention may be selected from the group consisting of hydrocarbons of 1 to 6 carbon atoms such as methane, ethane, propane, butane, pentane, hexane, isopropane, isobutene, 2-butane, isopentane, 2-pentane, tertiary pentane, isohexane, 2-hexane and the like; alcohols of 1 to 6 carbon atoms such as methanol, ethanol, propanol, butanol, hexanol and the like; $SO_2$; $NH_3$; CO; and combinations thereof In this case, it is preferred that the amount of the reductant in the gas mixture be 0.001~21 wt %. When the amount of the reductant is less than 0.001 wt %, NO and $N_2O$ cannot be sufficiently reduced into $N_2$ and $O_2$ because of insufficient reduction ability. Further, when the amount thereof is more than 21 wt %, a large amount of untreated reductant and a large amount of side product are produced, and thus a process is additionally required to remove the untreated reductant and side products.

Moreover, the reductant may be used together with oxygen ($O_2$). It is preferred that the amount of oxygen in the gas mixture be 0.001~21 wt %. When the amount thereof is less than 0.001 wt %, NO and $N_2O$ cannot be reduced into $N_2$ and $O_2$ because the reductant cannot be oxidized. Further, when the amount thereof is more than 21 wt %, oxygen ($O_2$) occupies the active sites of the catalyst, so that NO and $N_2O$ cannot react, thereby remarkably decreasing the decomposition ratio thereof.

In the decomposition reaction of the present invention, the gas hour space velocity (GHSV) of the gas passing through the catalyst layer may be 1,000 $h^{-1}$~200,000 $^{-1}$, preferably 30,000~100,000 $h^{-1}$. When the GHSV thereof is less than 1,000 $h^-$, the amount of the treated gas is small, and thus the catalyst is economically inefficient. Further, when the GHSV thereof is more than 200,000 $h^-$, the contact time between the gas and the catalyst is short, thus decreasing the decomposition efficiency of $NO_x$ or $N_2O$.

Meanwhile, it is preferred that the pressure of the gas passing through the catalyst layer be 1 atm or more. As the pressure thereof increases, the decomposition ratio of nitrogen oxide increases.

According to the present invention, in the reaction of decomposing $NO_x$, $N_2O$ and a mixture thereof using the mixed metal oxide catalyst produced from the hydrotalcite precursor, the temperature of the gas passing through the catalyst layer may be 100~500° C. preferably 100~300° C. and more preferably 150∞250° C. When the temperature thereof is lower than 100° C. sufficient activation energy cannot be obtained, and thus $NO_x$ and $N_2O$ cannot be decomposed. In the case of the catalyst of the present invention, the decomposition efficiency of gas is high even at 500° C. or lower. Therefore, when the temperature thereof is higher than 500° C. energy consumption is excessive so that it takes a lot of money to decompose $NO_x$ and $N_2O$.

The nitrogen oxide decomposition rate of the mixed metal oxide catalyst of the present invention is equal to that of a mixed metal oxide catalyst in which a hydrotalcite precursor is impregnated or intercalated with a precious metal. Meanwhile, the above-mentioned effects can also be achieved by a mixed metal oxide catalyst produced from a brucite precursor, not a hydrotalcite precursor. The brucite precursor is represented by Formula 1 above wherein a=0 and x=0. As described in the following Example, it can be seen that, when nitrogen oxide is decomposed using the mixed metal oxide catalyst in which a brucite precursor is impregnated or intercalated with a nonprecious metal, the decomposition efficiency of nitrogen oxide is high even at low temperature (refer to Comparative Example 6).

Mode for Invention

Hereinafter, the present invention will be described in more detail with reference to the following Examples. However, the scope of the present invention is not limited to these Examples.

EXAMPLES

Manufacture of a Mixed Metal Oxide Catalyst

NaOH and $Na_2CO_3$ were dissolved in distilled water at a molar ratio of 3.5: 1 to prepare a solution. The solution was put into a reactor, and was then stirred at a predetermined speed while slowly adding a solution prepared by dissolving metal (II) nitrate (Co nitrate, Fe nitrate or the like), metal (III)

nitrate (Al nitrate, Mn nitrate or the like) and alkaline nitrate (K nitrate or the like) in distilled water at a predetermined molar ratio for 4 hours to obtain precipitates. The precipitates were stirred for 30 minutes to uniformly mix them. The mixed precipitate was aged at 65° C. for 16 hours to obtain a reaction product. The reaction product was washed with an excessive amount of distilled water three times to obtain a hydrotalcite compound. The obtained hydrotalcite compound was mixed with a nonprecious metal nitrate (nickel nitrate or the like) solution to impregnate or intercalate it with a nonprecious metal as a result of an ion exchange reaction. Thereafter, the hydrotalcite compound impregnated or intercalated with a nonprecious metal was washed with distilled water, and was then dried at 110° C. for 12 hours to obtain a hydrotalcite precursor. The hydrotalcite precursor was heated from 25° C. to 500° C. and was then calcinated at 500° C. for 4 hours to manufacture a mixed metal oxide catalyst. The manufactured mixed metal oxide catalyst was put into a desiccator and then pretreated (completely reduced) under a nitrogen or CO atmosphere before it was used in the $N_2O$ decomposition test.

Measurement of Decomposition Rate of Nitrogen Oxide

Comparative Example 1

The decomposition rate of $N_2O$ in a gas mixture including 12,500 ppm of $N_2O$, 12,500 ppm of CO and nitrogen ($N_2$, remainder) and having a flow rate of 200 ml/min (SV 42,000 $hr^{-1}$) was measured using 0.2 g of a mixed metal oxide catalyst produced from a hydrotalcite precursor and having a molar ratio of Co—Pd—Ce—Al of 2/0.01/0.01/1. The decomposition rate thereof under these conditions was 96% at 200° C. and 100% at 250° C. or more.

Comparative Example 2

The decomposition rates of $N_2O$ and NO in a gas mixture including 12,500 ppm of $N_2O$, 12,500 ppm of CO, 100 ppm of NO and nitrogen ($N_2$, remainder) and having a flow rate of 200 ml/min (SV 30,000 $hr^{-1}$) were measured using 0.4 g of a mixed metal oxide catalyst produced from a hydrotalcite precursor and having a molar ratio of Co—Rh—Ce—Al of 1/0.2/0.01/1. The decomposition rate of $N_2O$ under these conditions was 99% at 200° C. and the composition rate of NO was 99% at 200° C. and the decomposition rate of $N_2O$ was 100% at 250° C. or more and the composition rate of NO was 100% at 250° C. or more.

Comparative Example 3

The decomposition rate of $N_2O$ in a gas mixture including 12,500 ppm of $N_2O$, 17,500 ppm of CO and nitrogen ($N_2$, remainder) and having a flow rate of 200 ml/min (SV 30,000 $hr^{-1}$) was measured using 0.3 g of a mixed metal oxide catalyst produced from a hydrotalcite precursor and having a molar ratio of Co—Rh—Al of 1/0.2/1. The decomposition rate thereof under these conditions was 98% at 200 C and was 100% at 250° C. or more.

Comparative Example 4

The decomposition rate of $N_2O$ in a gas mixture including 12,500 ppm of $N_2O$, 12,500 ppm of CO and nitrogen ($N_2$, remainder) and having a flow rate of 200 ml/min (SV 30,000 $hr^{-1}$) was measured using 0.285 g of a mixed metal oxide catalyst produced from a hydrotalcite precursor and having a molar ratio of Co—Pd—Al of 1/0.1/1. The decomposition rate thereof under these conditions was 100% at 200° C. or more.

Comparative Example 5

The decomposition rate of NO in a gas mixture including 344 ppm of NO, 3,900 ppm of CO and nitrogen ($N_2$, remainder) and having a flow rate of 200 ml/min (SV 30,000 $hr^{-1}$) was measured using 3.397 g of a mixed metal oxide catalyst produced from a hydrotalcite precursor and having a molar ratio of Ni—Pd—Co of 1/0.05/1. The decomposition rate thereof under these conditions was 100% at 250° C. or more.

Comparative Example 6

The decomposition rate of NO in a gas mixture including 446 ppm of NO, 3,866 ppm of CO and nitrogen ($N_2$, remainder) and having a flow rate of 500 ml/min (SV 41,000 $hr^{-1}$) was measured using 3.397 g of a nickel (Ni) oxide catalyst produced from a brucite precursor. The decomposition rate thereof under these conditions was 100% at 200° C. or more.

Example 1

The decomposition rate of $N_2O$ in a gas mixture including 12,500 ppm of $N_2O$, 17,500 ppm of CO and nitrogen ($N_2$, remainder) and having a flow rate of 400 ml/min (SV 55,000 $hr^{-1}$) was measured using 0.20 g of a mixed metal oxide catalyst produced from a hydrotalcite precursor and having a molar ratio of Ni—K of 1/1. The decomposition rate thereof under these conditions was 92% at 175° C. and was 100% at 200° C. or more.

Example 2

The decomposition rate of $N_2O$ in a gas mixture including 12,500 ppm of $N_2O$, 17,500 ppm of CO and nitrogen ($N_2$, remainder) and having a flow rate of 400 ml/min (SV 55,000 $hr^{-1}$) was measured using 0.20 g of a mixed metal oxide catalyst produced from a hydrotalcite precursor and having a molar ratio of Ni—K of 1/0.5. The decomposition rate thereof under these conditions was 68% at 175° C. and was 100% at 200° C. or more.

Example 3

The decomposition rate of $N_2O$ in a gas mixture including 12,500 ppm of $N_2O$, 17,500 ppm of CO and nitrogen ($N_2$, remainder) and having a flow rate of 400 ml/min (SV 55,000 $hr^{-1}$) was measured using 0.20 g of a mixed metal oxide catalyst produced from a hydrotalcite precursor and having a molar ratio of Ni—K of 1/0.2. The decomposition rate thereof under these conditions was 51% at 175° C. and was 100% at 200° C. or more.

Example 4

The decomposition rate of $N_2O$ in a gas mixture including 12,500 ppm of $N_2O$, 12,500 ppm of NO, 30,000 ppm of CO and nitrogen ($N_2$, remainder) and having a flow rate of 400 ml/min (SV 55,000 $hr^{-1}$) was measured using 0.20 g of a mixed metal oxide catalyst produced from a hydrotalcite precursor and having a molar ratio of Ni—K of 1/1. The decomposition rate thereof under these conditions was 55% at 175° C. and was 100% at 200° C. or more.

Example 5

The decomposition rate of $N_2O$ in a gas mixture including 12,500 ppm of $N_2O$, 12,500 ppm of NO, 30,000 ppm of CO and nitrogen ($N_2$, remainder) and having a flow rate of 400 ml/min (SV 55,000 $hr^{-1}$) was measured using 0.20 g of a mixed metal oxide catalyst produced from a hydrotalcite precursor and having a molar ratio of Ni—K of 1/0.5. Under these conditions, the decomposition rate thereof was 78% at 200° C. and was 100% at 250° C. or more.

Example 6

The decomposition rate of $N_2O$ in a gas mixture including 12,500 ppm of $N_2O$, 12,500 ppm of NO, 30,000 ppm of CO and nitrogen ($N_2$, remainder) and having a flow rate of 400 ml/min (SV 55,000 $hr^{-1}$) was measured using 0.20 g of a mixed metal oxide catalyst produced from a hydrotalcite precursor and having a molar ratio of Ni—K of 1/0.2. Under these conditions, the decomposition rate thereof was 65% at 200° C. and was 100% at 250° C. or more.

Example 7

The decomposition rate of NO in a gas mixture including 2,000 ppm of NO, 4,000 ppm of CO and nitrogen ($N_2$, remainder) and having a flow rate of 500 ml/min (SV 75,000 $hr^{-1}$) was measured using 1.355 g of a mixed metal oxide catalyst produced from a hydrotalcite precursor and having a molar ratio of Ni—K of 1/1. Under these conditions, the decomposition rate thereof was 100% at 200° C.

Example 8

The decomposition rate of NO in a gas mixture including 2,000 ppm of NO, 4,000 ppm of CO and nitrogen ($N_2$, remainder) and having a flow rate of 500ml/min (SV 75,000 $hr^{-1}$) was measured using 1.898 g of a mixed metal oxide catalyst produced from a hydrotalcite precursor and having a molar ratio of Ni—K—Pd of 1/1/0.1. Under these conditions, the decomposition rate thereof was 85% at 200° C. and was 100% at 220° C. or more.

Example 9

The decomposition rates of $N_2O$ and NO in a gas mixture including 900 ppm of $N_2O$, 520 ppm of NO, 5,000 ppm of CO, and nitrogen ($N_2$, remainder) and having a flow rate of 500 ml/min (SV 33,000 $hr^{-1}$) were measured using 3.72 g of a mixed metal oxide catalyst produced from a hydrotalcite precursor and having a molar ratio of Ni—K—Pd of 1/0.2/0.1. Under these conditions, the decomposition rates of NO and $N_2O$ were 100% and 80% at 200 C respectively, and the composition rates of NO and $N_2O$ were all 100% at 250° C. or more.

Example 10

The decomposition rate of $N_2O$ in a gas mixture including 785 ppm of $N_2O$, 30,000 ppm of CO and nitrogen ($N_2$, remainder) and having a flow rate of 500 ml/min (SV 39,000 $hr^{-1}$) was measured using 3.582 g of a mixed metal oxide catalyst produced from a hydrotalcite precursor and having a molar ratio of Ni—K—Rh of 1/0.2/0.02. Under these conditions, the decomposition rate thereof was 98% at 200° C. and was 100% at 220° C. or more.

Example 11

The decomposition rate of NO in a gas mixture including 435 ppm of NO, 20,000 ppm of CO and nitrogen ($N_2$, remainder) and having a flow rate of 500 ml/min (SV 39,000 $hr^{-1}$) was measured using 3.582 g of a mixed metal oxide catalyst produced from a hydrotalcite precursor and having a molar ratio of Ni—K—Rh of 1/0.2/0.02. Under these conditions, the decomposition rate thereof was 100% at 200° C. or more.

Example 12

The decomposition rate of $N_2O$ in a gas mixture including 12,500 ppm of $N_2O$, 12,500 ppm of NO, 17,500 ppm of CO, 125 ppm of $SO_2$ and nitrogen ($N_2$, remainder) and having a flow rate of 400 ml/min (SV 55,000 $hr^{-1}$) was measured using 0.20 g of a mixed metal oxide catalyst produced from a hydrotalcite precursor and having a molar ratio of Ni—K of 1/1. Under these conditions, the decomposition rate thereof was 100% at 200° C. or more.

Example 13

The decomposition rate of $N_2O$ in a gas mixture including 12,500ppm of $N_2O$, 12,500 ppm of NO, 17,500 ppm of CO, 150 ppm of $NH_3$ and nitrogen ($N_2$, remainder) and having a flow rate of 400 ml/min (SV 55,000 $hr^{-1}$) was measured using 0.20 g of a mixed metal oxide catalyst produced from a hydrotalcite precursor and having a molar ratio of Ni—K of 1/1. Under these conditions, the decomposition rate thereof was 100% at 200° C. or more.

The compositions, reaction conditions and nitrogen oxide decomposition rates of Comparative Examples 1 to 6 and Examples 1 to 13 are given in Table 1 below.

TABLE 1

| | Composition | | | | Results of decomposition of nitrogen oxide | |
|---|---|---|---|---|---|---|
| | Component | Ratio (mass) | Total gas composition | Flow rate | Target | Decomposition rate |
| Comp. Ex. 1 | Co—Pd—Ce—Al | 2/0.01/0.01/1 (0.2 g) | $N_2O$ 125000 ppm/CO 125000 ppm/ nitrogen gas | 200 ml/min (SV 42000 $hr^{-1}$) | $N_2O$ | 200° C.  96% <br> 250° C.≥ 100% |
| Comp. Ex. 2 | Co—Rh—Ce—Al | 2/0.2/0.01/1 (0.4 g) | $N_2O$ 125000 ppm/CO 125000 ppm/NO 100 ppm/ nitrogen gas | 200 ml/min (SV 30000 $hr^{-1}$) | $N_2O$ <br> NO | 200° C.  99% <br> 250° C.≥ 100% <br> 200° C.  99% <br> 250° C.≥ 100% |
| Comp. Ex. 3 | Co—Rh—Al | 1/0.2/1 (0.3 g) | $N_2O$ 125000 ppm/CO 175000 ppm/ nitrogen gas | 200 ml/min (SV 30000 $hr^{-1}$) | $N_2O$ | 200° C.  98% <br> 250° C.≥ 100% |

TABLE 1-continued

| | Composition | | | | Results of decomposition of nitrogen oxide | | |
|---|---|---|---|---|---|---|---|
| | Component | Ratio (mass) | Total gas composition | Flow rate | Target | Decomposition rate | |
| Comp. Ex. 4 | Co—Pd—Al | 1/0.1/1 (0.285 g) | $N_2O$ 125000 ppm/CO 125000 ppm/ nitrogen gas | 200 ml/min (SV 30000 $hr^{-1}$) | $N_2O$ | 200° C.≥ | 100% |
| Comp. Ex. 5 | Ni—Pd—Co | 1/0.05/1 (3.397 g) | NO 344 ppm/CO 3900 ppm/ nitrogen gas | 400 ml/min (SV 39000 $hr^{-4}$) | NO | 250° C.≥ | 100% |
| Comp. Ex. 6 | Ni | (3.394 g) | NO 446 ppm/CO 3866 ppm/ nitrogen gas | 500 ml/min (SV 41000 $hr^{-1}$) | NO | 200° C.≥ | 100% |
| Ex. 1 | Ni—K | 1/1 (0.20 g) | $N_2O$ 125000 ppm/CO 175000 ppm/ nitrogen gas | 400 ml/min (SV 55000 $hr^{-1}$) | $N_2O$ | 175° C. 200° C.≥ | 92% 100% |
| Ex. 2 | Ni—K | 1/0.5 (0.20 g) | $N_2O$ 125000 ppm/CO 175000 ppm/ nitrogen gas | 400 ml/min (SV 55000 $hr^{-1}$) | $N_2O$ | 175° C. 200° C.≥ | 68% 100% |
| Ex. 3 | Ni—K | 1/0.2 (0.20 g) | $N_2O$ 125000 ppm/CO 175000 ppm/ nitrogen gas | 400 ml/min (SV 55000 $hr^{-1}$) | $N_2O$ | 175° C. 200° C.≥ | 51% 100% |
| Ex. 4 | Ni—K | 1/1 (0.20 g) | $N_2O$ 125000 ppm/CO 30000 ppm/NO 12500 ppm/ nitrogen gas | 400 ml/min (SV 55000 $hr^{-1}$) | $N_2O$ | 175° C. 200° C.≥ | 55% 100% |
| Ex. 5 | Ni—K | 1/0.5 (0.20 g) | $N_2O$ 125000 ppm/CO 30000 ppm/NO 12500 ppm/ nitrogen gas | 400 ml/min (SV 55000 $hr^{-1}$) | $N_2O$ | 200° C. 250° C.≥ | 78% 100% |
| Ex. 6 | Ni—K | 1/0.2 (0.20 g) | $N_2O$ 125000 ppm/CO 30000 ppm/NO 12500 ppm/ nitrogen gas | 400 ml/min (SV 55000 $hr^{-1}$) | $N_2O$ | 200° C. 250° C.≥ | 65% 100% |
| Ex. 7 | Ni—K | 1/1 (1.355 g) | NO 2000 ppm/CO 4000 ppm/ nitrogen gas | 700 ml/min (SV 75000 $hr^{-1}$) | NO | 200° C.≥ | 100% |
| Ex. 8 | Ni—K—Pd | 1/1/0.1 (1.898 g) | NO 2000 ppm/CO 4000 ppm/ nitrogen gas | 500 ml/min (SV 75000 $hr^{-1}$) | NO | 200° C. 220° C.≥ | 85% 100% |
| Ex. 9 | Ni—K—Pd | 1/0.2/0.1 (3.72 g) | $N_2O$ 900 ppm/CO 5000 ppm/NO 520 ppm/ nitrogen gas | 500 ml/min (SV 33000 $hr^{-1}$) | $N_2O$ NO | 200° C. 250° C.≥ 200° C. 250° C.≥ | 80% 100% 100% 100% |
| Ex. 10 | Ni—K—Rh | 1/0.2/0.02 (3.582 g) | $N_2O$ 785 ppm/CO 3000 ppm/ nitrogen gas | 500 ml/min (SV 39000 $hr^{-1}$) | $N_2O$ | 200° C. 220° C.≥ | 98% 100% |
| Ex. 11 | Ni—K—Rh | 1/0.2/0.02 (3.582 g) | NO 435 ppm/CO 2000 ppm/ nitrogen gas | 500 ml/min (SV 39000 $hr^{-1}$) | NO | 200° C.≥ | 100% |
| Ex. 12 | Ni—K | 1/1 (0.20 g) | $N_2O$ 125000 ppm/CO 17500 ppm/NO 12500 ppm/$SO_2$ 125 ppm/ nitrogen gas | 400 ml/min (SV 55000 $hr^{-1}$) | $N_2O$ | 200° C.≥ | 100% |
| Ex. 13 | Ni—K | 1/1 (0.20 g) | $N_2O$ 125000 ppm/CO 17500 ppm/NO 12500 ppm/$NH_3$ 150 ppm/ nitrogen gas | 400 ml/min (SV 55000 $hr^{-1}$) | $N_2O$ | 200° C.≥ | 100% |

From Table 1 above, it can be ascertained that the effect of the mixed metal oxide catalyst of the present invention, in which a hydrotalcite precursor containing an alkali metal is impregnated or intercalated with a nonprecious metal, is equal to that of a conventional metal oxide catalyst containing a precious metal such as Rh, Pd or the like in the point that the nitrogen oxide decomposition of the mixed metal oxide catalyst of the present invention reaches 100% at 250° C. or lower.

Further, it can be ascertained that, in the present invention, the increase in the decomposition rate of nitrogen oxide depends on the increased amount of an alkali metal (refer to Example 1 to 3) or the increased amount of a reductant (refer to 4, 13 and 14).

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

The invention claimed is:

1. A method of decomposing nitrogen oxide using a mixed metal oxide catalyst, comprising the step of reacting nitrogen oxide including $N_2O$, $NO_x$ or a mixture thereof with a gas mixture including a reductant in the presence of a mixed metal oxide catalyst in which hydrotalcite precursor containing an alkali metal is impregnated or intercalated with a nonprecious metal by an ion exchange reaction, and calcinated to form a mixed metal oxide catalyst, wherein the hydrotalcite precursor containing an alkali metal is represented by Formula 1 below:

$$L^+_a \cdot [M^{2+}_{1-x} N^{3+}_x (OH)_2]^{x+} [A^{n-}_{(x+a)/n} \cdot bH_2O] \quad \text{[Formula 1]}$$

wherein $L^+$ is at least one selected from the group consisting of $Na^+$, $K^+$, $Li^+$, $Rb^+$, $Cs^+$ and $Fr^+$;

$M^{2+}$ is at least one selected from the group consisting of $Mg^{2+}$, $Ca^{2+}$, $Ni^{2+}$, $Zn^{2+}$, $Sr^{2+}$, $Ba^{2+}$, $Fe^{2+}$, $Cu^{2+}$, $Co^{2+}$, $Pd^{2+}$ and $Mn^{2+}$;

$N^{3+}$ is at least one selected from the group consisting of $Al^{3+}$, $Mn^{3+}$, $Fe^{3+}$, $Co^{3+}$, $Ni^{3+}$, $Cr^{3+}$, $Ga^{3+}$, $B^{3+}$, $La^{3+}$, $Ce^{3+}$ and $Rh^{3+}$;

$A^{n-}$ is at least one selected from the group consisting of $CO_3^{2-}$, $NO^{3-}$, $SO_4^{2-}$, $Cl^-$, $OH^-$, $SiO_3^{2-}$, $MnO_4^{2-}$, $HPO_3^{2-}$, $MnO_4^{2-}$, $HGaO_3^{2-}$, $HVO_4^{2-}$, $ClO^{4-}$ and $BO_3^{2-}$;

x is 0.01~0.5; a is 0.01~1; and b is an integer of 0~20;

wherein the nonprecious metal is at least one selected from the group consisting of Ni, Co, Fe, Mn, Al, Ce, Cu, Zn, Ba, Mg, Ca and Sr, and an amount of the nonprecious metal is 0.012~20 wt %, wherein an amount of the nitrogen oxide is 0.001~31 wt %, and an amount of the reductant is 0.001~21 wt %.

2. The method of decomposing nitrogen oxide using a mixed metal oxide catalyst according to claim 1, wherein the reductant is at least one member selected from the group consisting of a hydrocarbon of 1 to 6 carbon atoms, an alcohol of 1 to 6 carbon atoms, $SO_2$, $NH_3$ and CO.

3. The method of decomposing nitrogen oxide using a mixed metal oxide catalyst according to claim 1, wherein gas passes through the catalyst at a gas hourspace velocity of 1,000 $h^{-1}$~200,000 $h^{-1}$, and a pressure of the gas is 1 atm or more.

4. The method of decomposing nitrogen oxide using a mixed metal oxide catalyst according to claim 1, wherein the reaction temperature is 150~500° C.

* * * * *